United States Patent [19]

Mandelcorn et al.

[11] 4,276,184

[45] Jun. 30, 1981

[54] DIELECTRIC FLUIDS COMPRISING NON-HALOGENATED MIXTURES OF ORGANIC ESTERS AND AROMATIC COMPOUNDS

[75] Inventors: Lyon Mandelcorn, Pittsburgh; Thomas W. Dakin; Robert L. Miller, both of Murrysville, all of Pa.

[73] Assignee: Westinghouse Electric Corp., Pittsburgh, Pa.

[21] Appl. No.: 671,854

[22] Filed: Mar. 30, 1976

Related U.S. Application Data

[63] Continuation of Ser. No. 502,127, Aug. 30, 1974, abandoned, which is a continuation of Ser. No. 272,995, Jul. 18, 1972, abandoned.

[51] Int. Cl.$^3$ .......................... H01B 3/22; H01B 3/20
[52] U.S. Cl. ..................................... 252/579
[58] Field of Search .................... 252/64, 63, 57, 79, 252/407, 565; 317/258, 259; 361/315, 319

[56] References Cited

U.S. PATENT DOCUMENTS

| | | | |
|---|---|---|---|
| 1,746,977 | 2/1930 | Wilder | 252/64 |
| 2,007,792 | 7/1935 | Clark | 252/64 |
| 2,176,952 | 10/1939 | Berberich | 252/64 |
| 2,672,448 | 3/1954 | Newnan et al. | 252/64 |
| 2,922,938 | 1/1960 | Petley | 252/64 X |
| 3,053,768 | 9/1962 | Cupper | 252/565 X |
| 3,112,356 | 11/1963 | Cohen | 252/64 X |
| 3,639,275 | 2/1972 | Stayner | 252/64 X |
| 3,673,093 | 6/1972 | Rocchi | 252/63 X |
| 3,754,173 | 8/1973 | Eustance | 317/259 |
| 3,796,934 | 3/1974 | Munch | 252/64 X |

FOREIGN PATENT DOCUMENTS 46-11863  3/1971  Japan .

OTHER PUBLICATIONS

Reynolds et al., "Evaluation of Dielectric Fluids by Gassing-Cell Tests", Proc. IEE, vol. 119, No. 4, Apr. 1972, pp. 497, 501, 502.

Sauer et al., "Stabilization of Dielectrics Operating under Direct Current Potential", Industrial & Engineering Chemistry, vol. 44, No. 1, Jan. 1952, pp. 135–140.

*Primary Examiner*—Harris A. Pitlick
*Attorney, Agent, or Firm*—R. D. Fuerle

[57] ABSTRACT

Dielectric fluids are disclosed which comprise about 20 to 95% of a non-halogenated organic ester which is liquid between $-20°$ C. and $150°$ C. and which has a dissipation factor of less than about 10% at $100°$ C., and about 5% to 80% of a non-halogenated, aromatic hydrocarbon or ether, which is soluble in the ester, has 1 to 2 rings, and has a dissipation factor of less than about 10% at $100°$ C. The preferred dielectric fluid is about 75 to 90% diisononyl phthalate and about 10 to 25% diphenyl oxide. An anti-oxidant and/or an additive to resist the effects of corona (partial discharges) are preferably included in the dielectric fluid. A capacitor containing a paper, film, or composite of these, impregnated with the dielectric fluid, is also disclosed.

7 Claims, 2 Drawing Figures

DIELECTRIC FLUIDS COMPRISING NON-HALOGENATED MIXTURES OF ORGANIC ESTERS AND AROMATIC COMPOUNDS

This is a continuation of application Ser. No. 502,127, filed Aug. 30, 1974, now abandoned, which is in turn a continuation of application Ser. No. 272,995, filed July 18, 1972, now abandoned.

BACKGROUND OF THE INVENTION

Dielectric fluids are used in capacitors, transformers, co-axial cables and other types of electrical apparatus to exclude gases from the insulating portion of the apparatus and thereby provide an insulation of higher voltage capability.

A good dielectric fluid should have a high electric strength, and be inexpensive and, preferably fire-resistant. It should be easily purifiable to achieve a low conductivity or dissipation factor. If it is used in capacitors, it should have a relatively high dielectric constant, and should be capable of impregnating the dielectric barrier of the capacitor. It should have good corona properties, especially if used in capacitors. Good corona properties include high corona (partial discharge) starting and extinction voltages in a test where the voltage is increased to the onset of corona and then decreased. Also, severe corona (which can occur sporadically in service) should not produce permanently damaging effects, such as persistent bubbles, which would depress considerably the corona extinction and restart voltages. The dielectric fluid should maintain its good electrical properties at high temperatures in the environment of the dielectric and metallic components of the device. It should not be too volatile since volatile liquids are difficult to handle and evaporate rapidly in service. When a dielectric fluid solidifies it cracks and loses electric strength. Therefore, a good dielectric fluid should have a low solidification or cracking temperature so that it can be used at low temperatures.

At the present time chlorinated diphenyl compounds such as trichlorodiphenyl (hereinafter "TCDP") are widely used commercially as dielectric fluids as they offer a very good compromise of these many desirable properties. However, dielectric fluids are used in large quantities and there is always the danger of an accidental spilling or leaking of the fluid. Many of the chlorinated compounds are not readily biodegradable but persist for long periods of time, accumulating in the food chain. Therefore, in spite of their desirable properties, it is quite possible that chlorinated diphenyls may soon be banned entirely for use as dielectric fluids or such precautionary practices may be imposed that their use would be very costly. Because environmental considerations have in recent years become a very important consideration in selecting dielectric fluids, great difficulty has been encountered in finding satisfactory substitutes for these halogenated dielectric fluids.

PRIOR ART

U.S. Pat. No. 2,176,952 discloses a mixture of mineral oil and diphenyl oxide as a dielectric fluid.

U.S. Pat. No. 2,253,506 discloses a capacitor fluid containing an ester and a hydroxy ether.

U.S. Pat. No. 1,746,977 discloses diphenyl oxide as dielectric fluid. Chlorinated diphenyl oxide is mentioned as being useful in lowering the melting temperature of diphenyl oxide.

U.S. Pat. No. 2,993,156 discloses corona inhibitors for mineral oil (col. 1, lines 29-33).

U.S. Pat. No. 2,096,550 discloses a dielectric medium of an ester of phthalic acid and a halogenated cyclic hydrocarbon.

U.S. Pat. No. 2,492,210 discloses mixtures of benzoates as dielectric fluids.

U.S. Pat. No. 2,169,872 discloses a dielectric fluid of halogenated benzene and halogenated diphenyl oxide.

SUMMARY OF THE INVENTION

We have found that a mixture of certain types of esters and certain types of hydrocarbons or ethers is a very good dielectric fluid and, most importantly, it is biodegradable and does not constitute a potential environmental hazard. In electrical properties such as electric strength, dissipation (or power) factor, dielectric constant, and corona properties, it is comparable to TCDP. Our dielectric fluids are easily purifiable to obtain a low dissipation factor. Their corona products do not persist as bubbles. The preferred dielectric fluids are superior to TCDP in preserving the life of a capacitor, which indicates thermal stability and inertness to the capacitor components. Finally, the dielectric fluids of this invention are less expensive than TCDP and can be used with the same dielectric materials used for capacitors which contained TCDP.

DESCRIPTION OF THE INVENTION

Figure 1:
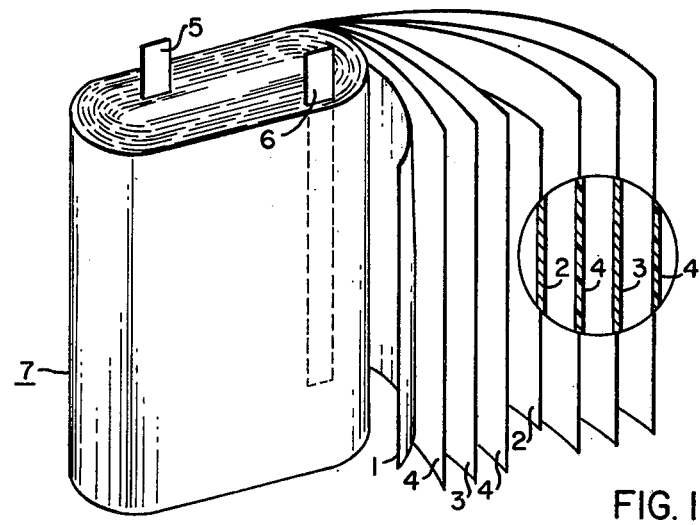
FIG. 1 is an isometric view with an enlargement window illustrating the construction of a film-paper-film capacitor winding according to this invention.

In FIG. 1 two layers of metal foil 1 and 2 are wound with layers of paper 3 and layers of plastic film 4. The plastic film is preferably polypropylene because it permits a capacitor to operate at a high KVAR (kilovolt-amperes reactive) per unit volume due to its high electric strength and low dissipation factor. Also, it is not degraded by the dielectric fluids of this invention even under extreme operating conditions. Other plastic films such as high density polyethylene could also be used. Leads 5 and 6 are connected to foils 1 and 2 respectively. The capacitor winding 7 is placed in can 8, and is impregnated with a dielectric fluid 9 (See FIG. 2). Leads 5 and 6 are connected to terminals 10 and 11 respectively.

The dielectric fluids of the invention comprise about 20 to about 95% (all percentages herein are by weight unless otherwise specified) of an organic ester and about 5 to about 80% of an aromatic hydrocarbon or ether. The dielectric fluids with the best properties comprise about 75 to about 90% of the organic ester and about 10 to about 25% of the aromatic hydrocarbon or ether.

The organic ester is a liquid within the entire temperature range from about $-20°$ C. to about 150° C. and has a dissipation factor of less than about 10% at 100° C. It preferably contains a benzene ring as aromatics have better corona resistance and have better thermal stability; either the formerly acid portion or the formerly base portion of the ester may be aromatic. Phthalic esters seem to have better properties than other esters and diisononyl phthalate (hereinafter "DINP") in particular has excellent properties. Other suitable esters include dibutyl adipate, diethyl adipate, diisodecyl adipate, ethyl benzoate, n-butyl benzoate, isopropyl benzoate, isobutyl benzoate, n-propyl benzoate, ethyl caproate, ethyl caprylate, methyl caprylate, diethyl malonate, dimethyl malonate, diethyl oxalate, dibutyl phthalate, diethyl phthalate, dimethyl phthalate, dioctyl phthalate, diethyl succinate, butyl valerate, etc. Mixtures of suitable esters may be formulated to meet the temperature requirements and may also be used, where the individual esters do not meet the temperature requirements.

The aromatic hydrocarbon or aromatic ether is a compound which is soluble in the ester, has 1 or 2 rings, and has a dissipation factor of less than about 10% at 100° C. It should have low vapor pressures, since low boiling compounds are hard to handle and may evaporate in a capacitor, and its boiling point preferably should exceed 140° C. Two ring compounds are preferred as they have boiling points over 140° C. Diphenyl oxide (hereinafter "DPO") is preferred as it has excellent electrical properties and does not soften the polypropylene film or react with it in capacitors. Other suitable aromatic hydrocarbons or ethers include acinophtylene, anisole, benzene, ethyl benzene, propyl benzene, cumene, cymene, dibenzofuran, diphenyl, diphenylmethane, durene, fluorene, indene, mesitylene, naphthalene, phenotol, styrene, toluene, xylene, etc. Mixtures of aromatic hydrocarbons and/or ethers are also contemplated.

The dielectric fluid preferably also includes about 0.05 to about 5% (of the ester plus hydrocarbon or ether) of an anti-oxidant. The anti-oxidant is a free-radical inhibitor soluble in the solution of the ester and the hydrocarbon or ether. It helps to keep the dissipation factor low for a long time, both for the liquid itself and in a capacitor. The preferred amount of anti-oxidant is about 0.1 to about 0.3% and a preferred anti-oxidant is di-tert-butyl-paracresol (hereinafter "DTBPC") which has been found to work very well. Other suitable anti-oxidants include phenols of the formula:

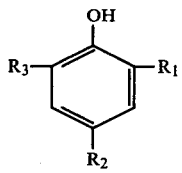

where the R groups are typically hydrogen or alkyl. Other anti-oxidants known to the art which do not significantly increase the dissipation factor of the dielectric fluid may also be used. Mixtures of anti-oxidants are also contemplated.

The dielectric fluid also preferably includes about 0.1 to about 3% (of the ester plus hydrocarbon or ether) of a corona-resistance additive to increase the resistance of the dielectric fluid to the effects of corona, by reducing the amount of time required to recover from an overvoltage which causes corona. This additive is a compound which reacts with and accepts hydrogen under discharge conditions and which is soluble in the solution of the ester and the aromatic ether or hydrocarbon. It is believed to function by accepting hydrogen which is formed by the corona, thereby reducing bubbles. A preferred additive is $\beta$-methylanthraquinone as it is easy to handle and stable. Other suitable additives includes azobenzene, anthraquinone, and other materials that are hydrogen acceptors. Mixtures of additives may also be used.

The following examples further illustrate this invention.

EXAMPLE 1

A mixture of 80% DINP-20% DPO was prepared and several of its properties were compared to those to TCDP and mineral oil:

| Property | 80% DINP −20% DPO | TCDP | Mineral Oil |
|---|---|---|---|
| Electric Strength (Kv) -ASTM 01816 | 48 | 40 | 35 |
| Dielectric Constant at 100° C. | 3.7 | 4.9 | 2.2 |
| Dissipation Factor (%) at 100° C. | 0.4 | 0.2 | <0.05 |
| Viscosity (cps) at 20° C. | 34.8 | 64.5 | 18.4 |
| Fire Point (°C.) | 160 | 670 | 150 |
| Solidification Point (°C.) | <−40 | <−40 | <−40 |
| Vapor Pressure at 50° C. (Torr) | 0.17 | 0.015 | .05 |

The above data shows that the DINP-DPO mixture has satisfactory properties for capacitor manufacturing (i.e., low enough viscosity and vapor pressure, and high enough fire point), and capacitor performance, which will be demonstrated more fully in the following examples. Since its fire point is the same as that for mineral oil, similar precautions to those which have been developed and accepted for mineral oil should be used for it.

EXAMPLE 2

Small test capacitors were made where each contained a winding of a flattened roll of sheets of 0.23 mil aluminum foil, 0.5 mil polypropylene, 0.55 mil 0.7 density paper, 0.5 mil polypropylene, 0.23 mil aluminum foil, 0.5 mil polypropylene, 0.55 mil paper, and 0.5 mil polypropylene. These windings were about 3 inches high and 2 inches wide and ⅜ inches thick and had a capacitance of about 0.3 μF. Some capacitors were impregnated with DINP and some with 80% DINP-20% DPO. The processing was done according to methods that are well known and used by those skilled in the art. The impregnation was done by adding the dielectric fluid under vacuum, pressurizing to atmospheric pressure, and then applying a vacuum-pressurizing cycle several times. The units impregnated with 80% DINP-20% DPO required fewer such cycles to be impregnated than did those with DINP.

EXAMPLE 3

Capacitors were prepared as in Example 2, with 80% DINP-20% DPO and with TCDP. The following table gives the results of tests on these capacitors, and includes extrapolated data for mineral oil impregnated capacitors.

| | | Dielectric Fluid | | |
|---|---|---|---|---|
| Property | Temp. °C. | 80% DINP −20% DPO | TCDP | Mineral Oil |
| Average dielectric constant ($\Sigma_r'$) | 25 | 2.9 | 3.1 | 2.6 |
| Power Factor (%) at the operating voltage | 85 | .04 | .05 | low |
| | 125 | .06 | .08 | |
| Corona starting voltage (volts) | 25 | 2700 | 3200 | 2600 |
| Corona extinction voltage (volts) | 25 | 2100 | 2600 | 600 |
| Minimum corona starting voltage | −40 & | 2500* | 1900** | — |

-continued

| Property | Temp. °C. | Dielectric Fluid | | |
|---|---|---|---|---|
| | | 80% DINP −20% DPO | TCDP | Mineral Oil |
| (volts) Minimum corona extinction voltage (volts) | above −40 & above | 1600* | 1600** | — |

*at −40° C.
**at −20° C.

The above table shows that the capacitors impregnated with DINP-DPO had dielectric constants and power factors comparable to the capacitors impregnated with TCDP. It also shows that mineral oil is a relatively poor impregnant for such capacitors because it gives a low corona extinction voltage, which would cause the capacitors to have a low extinction voltage, and a low average dielectric constant.

EXAMPLE 4

Using capacitors prepared as in Example 2, with various dielectric fluids, their corona characteristics were measured. The following table gives the results:

| Dielectric Fluid | Time (min) until corona extinguished at 1600 V. after a 6 second overvoltage of | | Corona starting voltage | Corona extinction voltage |
|---|---|---|---|---|
| | 5300 V. (Series) | 4300 V. (Shunt) | | |
| TCDP | <1 | — | 3200 | 2600 |
| 80% DINP-20% DPO with 0.15% DTBPC | >20 | 14 | 2600 | 2100 |
| 80% DINP-20% DPO with 2% β-methyl anthraquinone | 3.5, 5 | 4 | 2800 | 2300 |
| 80% DINP-20% DPO with 1% azobenzene and 0.15% DTBPC | 4, 12 | — | 2600 | 2000 |
| 80% DINP-20% biphenyl | >30 | >30, 30 | 3000 | 2000 |
| 80% DINP-20% naphthalene | >40 | >40 | 2400 | 1900 |
| 80% di-ethylhexylphthalate −20% DPO with 0.2% DTBPC | 6, 12 | — | 2400 | 1800 |
| 80% di-isodecyladipate −20% DPO | 25 | 6 | 3100 | 2600 |
| DINP | >27 | >30 | 2700 | 1700 |

The above test is considered to be extremely severe with regard to the 6 seconds of continuous overvoltage. These overvoltages of 5300 and 4300 volts are the highest expected in power capacitor service, respectively in series and shunt applications, for dielectrics of this composition, and they would occur for only a fraction of a cycle (<1/60 second) at any time. This test demonstrates, with a large margin of assurance, whether a given dielectric will recover from the effects of such overvoltages. The table shows that the addition of DPO to DINP substantially increased the corona resistance. The anti-oxidant DTBPC did not affect this further, but a hydrogen acceptor, such as β-methyl anthraquinone or azobenzene, improved it further.

EXAMPLE 5

Using test capacitors as described in Example 2 impregnated with various dielectric fluids, the life of the capacitors were determined by aging at 125° C. with 1600 volts applied. The end point for the life of the capacitor was considered to be reached when the dissipation factor increased to a level at which thermal runaway can occur in a large power capacitor. The following table gives the results, where "relative life" is the ratio of the life of the capacitor to the life of a capacitor impregnated with TCDP:

| Dielectric Fluid | Relative Life at 125° C. |
|---|---|
| 80% DINP-20% DPO | 0.8 |
| 80%DINP-20% DPO with 0.15% DTBPC | 1.7 |
| 80% DINP-20% DPO with 0.26% DTBPC | 2.1 |
| 75% DINP-25% DPO | 0.8 |
| 50% DINP-50% DPO | 1.1 |

The above data indicates that the dielectric fluids of this invention are especially good impregnants for film-paper capacitors and all-paper capacitors and that capacitors impregnated with the dielectric fluids of this invention which contain anti-oxidants have a far greater life than do capacitors impregnated with TCDP. The data indicates an operating life of at least about 40 years may be expected for 150 KVAR power capacitors (with a hot spot of 85° C. occurring 10% of the time) when the dielectric fluid is 80% DINP-20% DPO with 0.26% DTBPC.

EXAMPLE 6

Capacitors of 0.8 μF. were made with two layers of 0.45 mil 0.9 density paper between aluminum foil. The capacitors were impregnated with 80% DINP-20% DPO. The power factors were determined to be 0.26% at 85° C. and 0.38% at 125° C. with 440 volts applied. The corona starting voltages were above 800 volts. These capacitors could be used for lighting ballast, motor start, commutator and low voltage power factor corrections.

EXAMPLE 7

One liter volumes were prepared of 80% DINP-20% DPO and 80% DINP-20% DPO containing 0.15% DTBPC anti-oxidant. Both liquids were exposed to ambient air at 100° C. After four days the dissipation factor of the liquid which did not contain the anti-oxidant had increased to more than 10%. After two weeks the dissipation factor of the liquid which contained the anti-oxidant had increased less than 1%.

EXAMPLE 8

Figure 2:
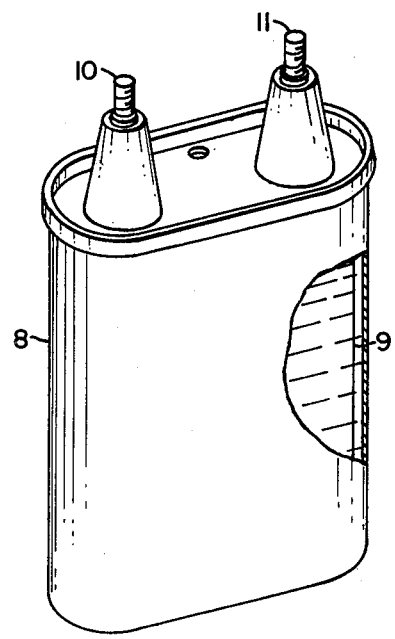
FIG. 2 is an isometric view partially cutaway showing the winding of FIG. 1 mounted in a can to form a completed capacitor.

Test capacitor sections were prepared according to Example 5, where 0.15% DTBPC was used, some with tinned copper leads and others with aluminum leads, and placed in steel cans as shown in FIG. 2. The capacitors were operated at 115° C. with 1600 volts. Both groups had the same operating stability, with no deleterious effects due to the presence of copper. Copper catalyses the degradation of organics with a large percentage of hydrogen, such as this impregnant, but the anti-oxidant is believed to have inhibited this effect.

We claim:

1. A dielectric fluid comprising about 20 to about 95% diisononyl phthalate and about 5 to about 80% of a non-halogenated aromatic compound selected from the group consisting of hydrocarbons, ethers, and mixtures thereof, which is soluble in diisononyl phthalate, has 2 rings, has a boiling point over 140° C., and has a dissipation factor of less than about 10% at 100° C.

2. A dielectric fluid according to claim 1 wherein said aromatic compound is diphenyl oxide.

3. A dielectric fluid according to claim 1 wherein the amount of said diisononyl phthalate is about 75 to about 90% and the amount of said aromatic compound is about 10 to about 25%.

4. A dielectric fluid according to claim 1 which includes about 0.05 to about 5% of an anti-oxidant.

5. A dielectric fluid comprising about 75 to about 90% diisononyl phthalate and about 10 to about 25% diphenyl oxide.

6. A dielectric fluid according to claim 5 wherein the amount of diisononyl phthalate is about 80% and the amount of diphenyl oxide is about 20%.

7. A dielectric fluid according to claim 5 which includes about 0.1 to about 0.3% di-tert-butyl-paracresol.

* * * * *